United States Patent [19]

Gold et al.

[11] Patent Number: 4,986,594
[45] Date of Patent: Jan. 22, 1991

[54] AUTO WINDOW MOULDING

[76] Inventors: Peter Gold; Judith Gold; Meredith Gold, all of 465 North Wood Rd., Rockville Centre, N.Y. 11570

[21] Appl. No.: 552,925

[22] Filed: Jul. 16, 1990

[51] Int. Cl.⁵ .............................................. B60J 1/02
[52] U.S. Cl. ..................................... 296/201; 296/93; 52/208; 52/400
[58] Field of Search .................... 296/93, 201; 52/208, 52/400; 49/495

[56] References Cited

U.S. PATENT DOCUMENTS

| | | | |
|---|---|---|---|
| 4,358,917 | 11/1982 | Oda et al. | 52/400 |
| 4,405,174 | 9/1983 | Yamane et al. | 296/201 |
| 4,441,755 | 4/1984 | Endo et al. | 296/93 |
| 4,805,363 | 2/1989 | Gold | 52/208 |
| 4,833,847 | 5/1989 | Inayama | 52/208 |
| 4,850,640 | 7/1989 | Gold | 296/201 |

Primary Examiner—Robert R. Song

[57] ABSTRACT

In a window pane mounting arrangement, there is proposed an improved window moulding which can be neatly fitted to a clearance defined between the edge of the window pane and the peripheral flange of the window opening. The window moulding comprises an elongate band portion adapted to cover the clearance and a leg portion depending from the inboard surface of the band portion and disposed in the clearance. The improvement consists of openings in the leg portion to permit the flow of sealant therethrough to relieve pressure in the sealant while it cures, which pressure, if not relieved, would lift or otherwise adversely effect the positioning of the moulding.

2 Claims, 1 Drawing Sheet

U.S. Patent     Jan. 22, 1991     4,986,594
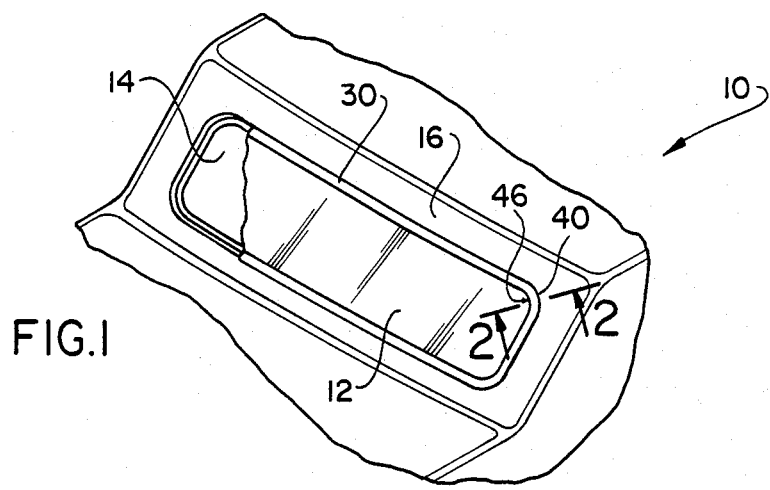
FIG.1
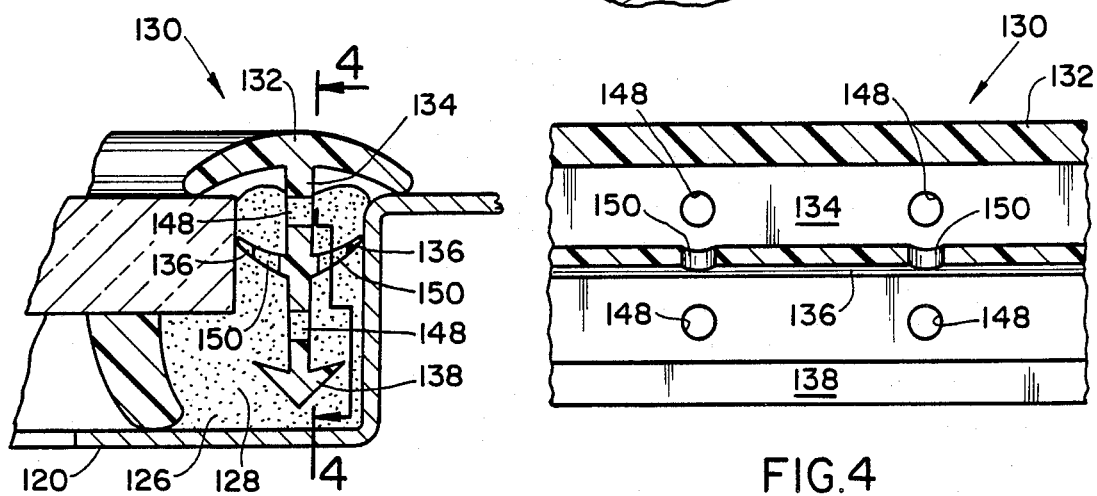
FIG.3
FIG.4
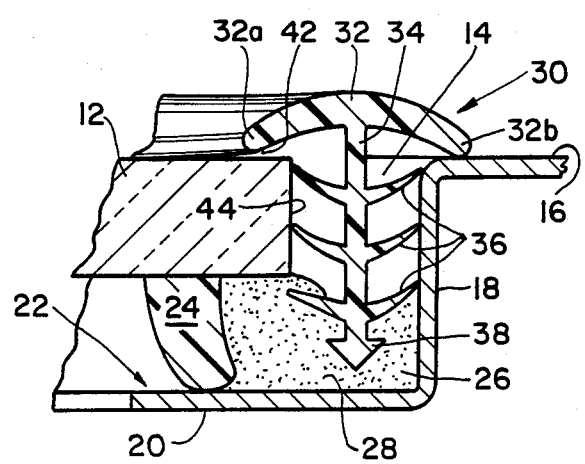
FIG.2
PRIOR ART
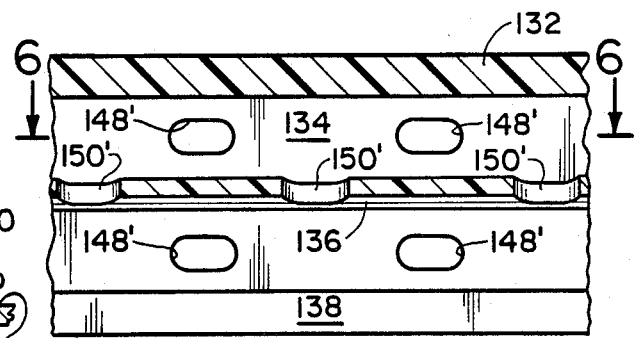
FIG.5
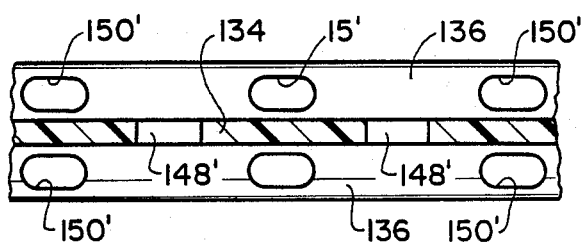
FIG.6

AUTO WINDOW MOULDING

The present invention relates generally to an auto front and rear window moulding, referred to in the trade as a window reveal moulding, and more particularly to a moulding or trim that will retain its position as an effective closure for the gap in which it is disposed in encircling relation about the window.

Current practice contemplates the use of an extruded resilient plastic reveal moulding for a vehicle body window installation which has a decorative trim or crown portion adapted to bridge the space between the window glass or pane and the body opening in overlying engagement therewith. The moulding is of a type having a stem extruded integral with a decorative crown portion and extending generally normal therefrom for insertion into the space preparatory to achieving a bond between an adhesive sealant previously placed in the space and the stem. While generally effective for the purposes intended, when the window corners are 90 degrees or approach this sharp angle of changing direction, i.e. are of a small radius turn, the known prior art moulding cannot be used at the corners because they exhibit gapping or lifting along the crown opposite edges at these corners, and also sometimes, in the straight length portions therebetween.

In contrast, the inventive window moulding can be used entirely about the periphery of the window, and specifically can be fitted in small radius corners, and still contribute to a finished, commercially acceptable appearance.

EXAMPLES OF PRIOR ART

U.S. Pat. No. 4,165,119 issued on Aug. 21, 1979 to Hedeen et al., describes a window reveal plastic moulding 50 which, according to accepted practice, has retrorse fins 58–68 on opposite sides of a depending stem 54 to center the top decorative trim portion or crown 52 over the gap between the window glass or pane 24 and window opening 22. This patent is instructive generally on the prior use of reveal moulding and is noted for this reason, but does indicate how reveal moulding can be used effectively in corners approaching 90 degrees.

U.S. Pat. No. 4,523,783 issued on June 18, 1985 to Yamada et al. does address the problem experienced using reveal moulding in a sharply curved corner, and illustrates in FIG. 3 the unsightly crumpling or gapping that occurs in the inner edge of the molding in this circumstance. As a solution, Yamada proposes flexuring of depending legs on the moulding to counter the gapping tendency.

In the inventive window moulding, crumpling or gapping is obviated in a simpler and effective manner by remedying a significant cause of the gapping or lifting of the crown opposite edges, all as will be explained in greater detail subsequently herein. Broadly, it is an object to obviate gapping in the moulding crown by equalizing pressures in the adhesive sealant during the curing thereof, which pressures when unequal urge the moulding and its crown through slight ascending movement which is manifested as gapping. More particularly, it is an object to have adhesive in locations unavoidably segregated by the moulding depending stem nevertheless freely able to flow relative thereto thus dissipate pressure buildups in the curing adhesive.

As will be noted as the description proceeds, structurally the inventive auto window mould hereof is very similar to that of the prior art, but the structural differences that exist, and which will be noted, are quite significant in that they enable the inventive window mould to achieve what the prior art window mould could not achieve This difference therebetween is, of course, set forth in the description which follows. It also is illustrated in the drawings in which, for comparison, the prior art moulding is illustrated in FIGS. 1 and 2 and the inventive window mould in remaining FIGS. 3–6. The drawing comparisons that are particularly instructive as to the differences between the prior art and the inventive window moulds are FIGS. 2 and 3.

Turning now to the drawings:

FIG. 1 is a partial perspective view of the rear window of a vehicle;

FIG. 2 is an enlarged scale cross sectional view taken along line 2—2 of FIG. 1 of a prior art window moulding or trim;

FIG. 3 is a view similar to FIG. 2 but showing a first embodiment of the within inventive window moulding;

FIG. 4 is a cross sectional view taken along line 4—4 of FIG. 3;

FIG. 5 is a view similar to FIG. 4, but of a second embodiment of the within inventive window moulding; and FIG. 6 is a cross sectional view taken along line 6—6 of FIG. 5.

During the installation of a vehicle window, be it in the factory or in a repair shop, the installation is completed by applying a combination weather seal and decorative moulding strip 30 as shown in FIG. 1, commonly referred to as a reveal moulding.

One form of a prior art strip 30 in popular use is shown in FIGS. 1 and 2, now to be described. The body panel 16 of the vehicle is shaped to receive the window panel 12. Within the formed body panel 16 and as best shown in FIG. 2, is typically a flange wall 18 and a transversely disposed leg flange 20. On the inside face of a window pane 12, a pre-assembled seal member 24 to the glass 12 is adapted to rest on flange leg 20 and act as a cushion between the glass 12 and said flange leg 20 about the periphery of the window opening. The space left between the edge 44 of the glass 12 and the wall 18 is aptly defined as a gap 26 into which it is contemplated that an adhesive or sealant 28 be applied after the glass 12 is in place. Seal member 24 also serves to contain or confine adhesive 28 within the gap 26. The glass installation is completed by inserting an extruded moulding strip 30 within gap 26 and into the uncured adhesive 28.

In FIG. 2, a popularly used strip 30 is illustrated in section and includes a crown member 32 having a center depending stem or wall 34 at whose base is an arrow shaped tip or barb 38. On each side of wall 34 are two or more retrorse fin-like members 36, in symmetrical relation about a centerline of the member. Since strip 30 is typically an extrusion molded from appropriate elastomeric or plastic construction material, it exhibits some flexibility with known characteristic limitations in tension and compression.

When strip 30 is pushed into gap 26, barb member 38 is buried deeply in adhesive 28 along with one or two tiers of fin members 36. Members 36 also flex and tend to center the wall 34 within the gap 26, and likewise also position the crown 32 with equal overhangs relative to the member's centerline upon the outside surface of glass 12 and on the vehicle body panel, thereby effectively creating a weathertight seal for the gap 26. Upon curing of the adhesive 28, the assembly of the vehicle body member glass pane 12 and strip 30 develop into a firmly bonded combination.

However, an inadvertent lifting of moulding 30 or raising of the edge portion 32 thereof frequently occurs during the curing of sealant 28, particularly, as best seen in FIGS. 1 and 2, when the moulding 30 is applied about a curved section 40 of opening 14. As moulding 30 traverses curve 40, compression and tension forces develop within the inner and outer sections 32a and 32b of the crown portion 32. This results in the referred to lifting or clearance 42 of either opposite end crown sections from either the glass 12 or the panel 16, thereby producing an unsightly rippling or crimping of strip portion 32.

Underlying the present invention is the recognition that the sealant or adhesive 28 on opposite sides of the depending leg 34 cures at different rates, with different corresponding pressures and forces being exerted on the leg 34 and upwardly against the underside of the crown 32, and that this significantly contributes to the edge-lifting or clearance voids 42. It is accordingly embodied is the within inventive strip 130, now to be described in connection with FIGS. 3–6, openings 148 and 150 in a select size and spacing, to allow for the equalization in pressure and forces generated in the adhesive 28 during the curing thereof on opposite sides of the strip depending leg 134.

More particularly, there is shown in FIGS. 3–6 the within inventive moulding designated, as above noted, by the reference numeral 130, which has many of the same structural features as already described in connection with the prior art moulding 30 of FIG. 2. For brevity's sake, these similar structural features, designated by the same reference numerals, but in the 100 series, will therefore not be described again. Thus, crown 32 of the prior art strip 30 and crown 132 of the inventive strip 130 are to be understood to be exemplary of similar structural features.

In the first embodiment of the present invention shown in FIGS. 3–6 the moulding or trim strip 130 is shown to have a trim crown or top portion 132, a stem member 134, retrorse fins 136 and an anchor bead 138. Moulding 130 is shown positioned in a cavity 126 that was previously filled almost completely with sealant 128. In this embodiment stem 134 is made with a spaced pattern of flow through pressure-equalizing openings 148 along its length. Optionally, the fin 136 is also provided with flow-through pressure equalizing openings 150. One preferred pattern for stem 134 is shown in FIG. 4, in which the openings 148 and 150 are in vertical alignment and are ⅛" in diameter at 1" intervals. Another pattern used with success is shown in FIGS. 5 and 6 and consists of alternately spaced stem and fin elongate apertures 148' and 150'.

During curing, the high pressure side of the stem member or depending leg 134 urges movement of sealant 128 through the openings 148 and 150 to the low pressure side, thereby obviating the gaping 42 of the crown edges 32a or 32b. In addition, the cured sealant in the openings 148, 150 is, of course, in spanning connected relation to the bodies of sealant on opposite sides of the stem or leg 134 and, in this advantageous location., contributes to preventing inadvertent dislodgement of the strip 130.

While the particular vehicle window moulding embodiment herein shown and disclosed in detail are fully capable of attaining the objects and providing the advantages hereinbefore stated, it is to be understood that they are merely illustrative of the presently preferred embodiments of the invention and that no limitations are intended to the detail of construction or design herein shown other than as defined in the appended claims.

What is claimed is:

1. In a motor vehicle body, an improved moulding for concealing the space between a body panel flange and the edge of a window panel mounted on a body panel flange by a curable adhesive of the type wherein said moulding has a crown portion adapted to bridge the space between the window panel and the body panel in overlying engagement therewith, and has a depending stem extruded integral with the crown portion extending generally normal therefrom for insertion into the space between the window panel and body panel and serving as a divider between the quantities of adhesive undergoing coring on opposite sides thereof, said improvements in said moulding comprising said stem having openings therethrough in communication with said opposite side-located adhesive so as to contribute to equalizing any pressure differential during the curing thereof, whereby the crown on said moulding remains in said overlying engagement as a bridge over said space between the window panel and the body panel.

2. The moulding as claimed in claim 1 including at least one fin extending laterally from opposite sides of said depending stem and also having openings therethrough so as to contribute to equalizing any pressure differential in said adhesive on opposite sides thereof during the curing thereof.

* * * * *